US009403680B2

(12) United States Patent
Fukunaga et al.

(10) Patent No.: US 9,403,680 B2
(45) Date of Patent: Aug. 2, 2016

(54) METHOD FOR PRODUCING SINTERED ALUMINUM NITRIDE GRANULES

(71) Applicant: Tokuyama Corporation, Yamaguchi (JP)

(72) Inventors: Yutaka Fukunaga, Yamaguchi (JP); Yukihiro Kanechika, Yamaguchi (JP)

(73) Assignee: Tokuyama Corporation, Tamaguchi (JP)

( * ) Notice: Subject to any disclaimer, the term of this patent is extended or adjusted under 35 U.S.C. 154(b) by 0 days.

(21) Appl. No.: 14/763,845

(22) PCT Filed: Feb. 4, 2013

(86) PCT No.: PCT/JP2013/052515
§ 371 (c)(1),
(2) Date: Sep. 15, 2015

(87) PCT Pub. No.: WO2014/118993
PCT Pub. Date: Aug. 7, 2014

(65) Prior Publication Data
US 2015/0376009 A1   Dec. 31, 2015

(51) Int. Cl.
*C01B 21/072* (2006.01)
*C09K 5/14* (2006.01)
(52) U.S. Cl.
CPC ........... *C01B 21/0726* (2013.01); *C01B 21/072* (2013.01); *C01B 21/0728* (2013.01); *C09K 5/14* (2013.01); *C01P 2004/03* (2013.01); *C01P 2004/50* (2013.01); *C01P 2004/61* (2013.01); *C01P 2006/12* (2013.01)

(58) Field of Classification Search
None
See application file for complete search history.

(56) References Cited

U.S. PATENT DOCUMENTS

| 5,367,006 A | 11/1994 | Hermansen et al. |
| 9,073,755 B2 | 7/2015 | Muneoka et al. |
| 2008/0200326 A1* | 8/2008 | Gotoh ................. C01B 21/0722 501/98.5 |
| 2012/0258310 A1* | 10/2012 | Watanabe ............. C01B 21/072 428/402 |

FOREIGN PATENT DOCUMENTS

| JP | 03295853 A | 12/1991 |
| JP | 0474705 A | 3/1992 |
| JP | 5270809 A | 10/1993 |
| JP | 0617024 A | 1/1994 |
| JP | 06209057 A | 7/1994 |
| JP | 2005146214 A | 6/2005 |
| WO | 2011093488 A1 | 3/2011 |
| WO | 2012029868 A1 | 3/2012 |

OTHER PUBLICATIONS

Ceramics, 39 (Sep. 2004), pp. 692-695.
English Abstract of JP 5270809.
(Continued)

*Primary Examiner* — Guinever S Gregorio
(74) *Attorney, Agent, or Firm* — Cahn & Samuels, LLP

(57) ABSTRACT

A method for producing sintered aluminum nitride granules includes a reduction nitridation step of carrying out the reduction nitridation of porous alumina granules at a temperature of 1400 to 1700° C. inclusive to produce porous aluminum nitride granules; and a sintering step of sintering the porous aluminum nitride granules, which are produced in the reduction nitridation step, at a temperature of 1580 to 1900° C. inclusive.

7 Claims, 1 Drawing Sheet

(56) References Cited

OTHER PUBLICATIONS

International Preliminary Report on Patentability, dated Aug. 4, 2015.
English Abstract of JP 2005146214.
English Abstract of WO 2011093488.
English Abstract of WO 2012029868.
English Abstract of JP 06209057.
English Abstract of JP 0617024.
English Abstract of JP 0474705.
English Abstract of JP 03295853.

* cited by examiner

METHOD FOR PRODUCING SINTERED ALUMINUM NITRIDE GRANULES

This application is a U.S. national stage application of PCT/JP2013/052515 filed on 4 Feb. 2013.

TECHNICAL FIELD

The present invention relates to sintered aluminum nitride granules and to a method for producing the same. Specifically, the present invention provides a method for easily producing sintered aluminum nitride granules having high thermal conductivity, excellent filling property into resin or so, an average particle size of 10 to 200 μm, and usefulness as a filler for heat-radiating materials, such as heat-radiating resin, grease, adhesive, and coating material.

BACKGROUND OF INVENTION

Aluminum nitride has a high thermal conductivity and an excellent electrically insulating property, and is used for such as a highly thermally conductive substrate, a heat-radiating product, and a filler for insulating heat radiation. In recent years, semiconductor electronic components, including IC and CPU mounted on high performance electronic devices represented by such as laptops and information terminals, have been downsized and highly integrated. Heat-radiating members have been accordingly required to be smaller. Heat-radiating members used for them include, for example, a heat-radiating sheet or a film spacer where a high heat conductive filler is filled in matrix such as resin and rubber (Patent Document 1), a heat-radiating grease with fluidity made by filling a high heat conductive filler in silicone oil (Patent Document 2), a heat-radiating adhesive where a high heat conductive filler is filled in epoxy resin (Patent Document 3). As a high heat conductive filler, aluminum nitride, boron nitride, alumina, magnesium oxide, silica, graphite, various metal powder, and the like are used.

By the way, to improve heat conductivity of heat-radiating members, it is important that a filler having a high thermal conductivity is densely filled, and thus aluminum nitride powder composed of spherical aluminum nitride particles of several μm to several tens μm is desired. However, aluminum nitride powder produced by a typical method has many particles of submicron order, and thus it is difficult to obtain aluminum nitride particles having a large particle size of several tens μm or so.

A method for making spherical aluminum nitride powder is disclosed as follows.

For example, Patent Document 4 discloses a method for producing spherical aluminum nitride particles by reductive nitrogenation of spherical alumina particles. Also, Patent Document 5 discloses a method for sintering spherical granulated powder obtained by adding a sintering assistant, a binder agent, and a solvent to aluminum nitride powder and performing spray dry thereof. Further, Non Patent Document 1 discloses that aluminum nitride powder is made spherical by being heat treated in a flux composed of a precursor, such as oxide or nitride of alkaline earth element or rare earth element and salt, hydroxide, halogenide, or alkoxide that generates the oxide or nitride due to decomposition during heating, or by directly conducting heat treatment of an aluminum-nitride based composition compounded due to adding a flux component thereto, and the flux is dissolved to perform isolation.

However, in the method of Patent Document 4, cavities are generated in particles with rise in conversion into aluminum nitride, and thus aluminum nitride powder is difficult to be a true sphere. Even if aluminum nitride powder can be a nearly true spherical shape, the aluminum nitride powder has a problem that strength against the crushing of the particles is small due to the cavities and bubbling is easy to occur when the aluminum nitride particles are filled in resin. On the other hand, in the method of Patent Document 5, a spherical granulated product where a sintering assistant is added to aluminum nitride is sintered, and thus particles having no cavities and a high strength against the crushing can be obtained. However, the method of Patent Document 5 has a problem that a starting material is expensive due to use of aluminum nitride powder therefor, and also has a problem that particles are easily combined with each other due to sintering. Further, the method of Non Patent Document 1 is disadvantageous to industrial scale due to high price of its starting materials and complexity of its steps.

CITATION LIST

Patent Document 1: JP A-2005-146214
Patent Document 2: JP A-6-209057
Patent Document 3: JP A-6-17024
Patent Document 4: JP A-4-74705
Patent Document 5: JP A-3-295853
Non Patent Document 1: Ceramics, 39 (2004 September), pp 692-695

SUMMARY OF INVENTION

Thus, an object of the present invention is to provide a method for relatively inexpensively and easily producing sintered aluminum nitride granules having high thermal conductivity, excellent filling property, an average particle size of 10 to 200 μm, and usefulness as a filler for heat-radiating materials.

The present inventors have conducted a keen study in an attempt to achieve the above object regarding spherical aluminum nitride powder as a filler. As a result, they have succeeded in obtaining dense sintered aluminum nitride granules with no fine pores due to alumina granules or cavities inside by using porous alumina granules or alumina hydrate granules (in the present specification, both of these are referred as "porous alumina granules") as a starting material, reductively nitrogenating the starting material to obtain porous aluminum nitride granules, and then firing the porous aluminum nitride granules to be sintered. Thus, the present invention has been completed.

That is, the present invention is a method for producing sintered aluminum nitride granules comprising the steps of:

reductively nitrogenating porous alumina granules at a temperature of 1400° C. or more and 1700° C. or less so as to obtain porous aluminum nitride granules; and sintering the porous aluminum nitride granules obtained in the step of reduction-nitridation at a temperature of 1580° C. or more and 1900° C. or less.

In the present invention, it is preferred that an average particle size of the porous alumina granules be 10 to 200 μm and that a BET specific surface area of the porous alumina granules be 2 to 250 m²/g.

Also, it is preferred that the step of reduction-nitridation and the step of sintering be performed in a state where carbon powder is mixed with the porous alumina granules and the porous aluminum nitride granules.

Further, it is economical to continuously perform the step of reduction-nitridation and the step of sintering in the same furnace because neither temperature decrease nor reheating is needed after the reductive nitrogenation.

The producing method of the present invention makes it possible to obtain dense sintered aluminum nitride granules whose average particle size is 10 to 200 μm and BET specific surface area is 0.05 m$^2$/g to 0.5 m$^2$/g.

Also, the sintered aluminum nitride granules of the present invention are useful as a filler for heat-radiating materials.

According to a producing method of the present invention, reductive nitrogenation and sintering are performed using porous alumina granules made of aggregate obtained by granulating, for example, alumina or alumina hydrate powder as a starting material, and thus it is possible to obtain sintered aluminum nitride granules relatively inexpensively compared to a conventional method using aluminum nitride powder as a starting material.

According to the conventional method that performs reductive nitrogenation using alumina granules with a large particle size as a starting material, a hollow body is formed easily. On the other hand, according to the producing method of the present invention, porous alumina granules are used as a starting material, and these are changed to porous aluminum nitride granules and then sintered, which makes it possible to obtain sintered aluminum nitride granules that are solid and have a high thermal conductivity and a high filling property into resin or so.

Further, as explained in detail later, when the reductive nitrogenation and the sintering are performed in a state where a certain amount of carbon powder is mixed, it is possible to prevent bonding of the granules and to stably produce desired sintered aluminum nitride granules.

DETAILED DESCRIPTION OF INVENTION

Figure 1:
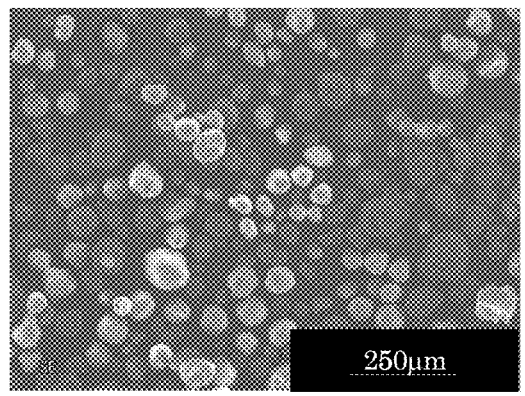
FIG. 1 is a scanning electron micrograph showing a particle structure of sintered aluminum nitride granules obtained in Example 2.

Hereinafter, a method for producing sintered aluminum nitride granules of the present invention will be explained in detail.

[Starting Materials]

In the method for producing sintered aluminum nitride granules in the present invention, porous alumina granules are used as a starting material. Specifically, the porous alumina granules used herein include not only porous alumina granules but also alumina hydrate granules. More specifically, it is possible to use alumina having a crystal structure of α, γ, θ, δ, η, κ, and χ or any materials that are transformed to α-alumina by dehydration transformation under heat such as boehmite, diaspore, gibbsite, bayerite and tohdite. As the porous alumina granules, each of the above materials may be used alone or some of them may be used while they are mixed. In particular, α-alumina, γ-alumina, and boehmite are favorably used, as these are highly reactive and easily controlled.

In the present invention, porous alumina granules having a porous structure are not limited to have a certain specific surface area, but preferably have a specific surface area of 2 to 250 m$^2$/g. When the specific surface area is less than 2 m$^2$/g, the granules are easily deformed. When the specific surface area is more than 250 m$^2$/g, sphericalness of the resulting sintered aluminum nitride granules tends to be low. Also, the porous alumina granules preferably have an average particle size of 10 to 200 μm, more preferably 15 to 150 μm, and still more preferably 20 to 100 μm. When the average particle size is less than 10 μm, an effect of high filling by increase in particle size of a filler may be small. When the average particle size is more than 200 μm, there is a tendency that a reductive nitrogenation reaction fails to proceed inside of the granules and unreacted aluminum oxide remain inside of the granules.

The porous alumina granules are generally in the form of aggregate where alumina powder or alumina hydrate powder (hereinafter, these are collectively called "alumina powder") is aggregated by granulation, and can be obtained by known granulation methods. Specifically, alumina powder is subject to a spray dry granulation, a rolling granulation or so, but the spray dry granulation is favorable to obtain a porous body. When a granulation is performed, if necessary, it is possible to blend alumina powder with dispersing agent, binder resin, lubricant, or composite compound including alkali earth metal compound, rare earth element compound, fluoride of alkali earth element and alkali earth element as promoter or sintering assistant of reductive nitrogenation reaction. The amount of these additives is appropriately determined within a known addition range.

In the present invention, to obtain desired spherical sintered aluminum nitride granules having high sphericalness as mentioned later, the spray dry granulation makes it possible to efficiently obtain spherical porous alumina granules and thus is particularly industrially advantageous.

In the present invention, compared to using nonporous alumina obtained by the melt-injection method as a starting material, a reductive nitrogenation with the porous alumina granules having gaps between particles of alumina powder can demonstrate an effect causing no cavities inside of resulting aluminum nitride granules.

[Step of Reduction-Nitridation]

In the present invention, a step of reduction-nitridation is a step of producing porous aluminum nitride granules by nitrogenating porous alumina granules in the presence of a reducing agent.

Any known reducing agent is used without limitation, but a carbon or reducing gas is typically used. Carbon black, graphite, carbon precursor that can be a carbon source under a high temperature reactive gas atmosphere can be used as the carbon without limitation. Among them, carbon black is favorable in view of carbon amount per weight and property stability. The carbon can be any particle size, but preferably has a particle size of 0.01 to 20 μm. Also, a fluid carbon source like liquid paraffin may be used together to prevent scattering of a starting material.

When a reducing gas is used, any reductive gas can be used without limitation. Specifically, hydrogen, carbon monoxide, ammonia, hydrocarbon gas, and the like can be used. Each of them may be used alone or may be used with the carbon or carbon precursor.

In the present invention, when a carbon is used as a reducing agent, it is preferred that porous alumina granules and the carbon be mixed while the carbon exists between the porous alumina granules to prevent aggregation of the granules in reductive nitrogenation.

Any method enabling to uniformly mix the porous alumina granules and the carbon may be used for the mixing method, but the mixing is typically preferably performed by blender, mixer, or ball mill.

In the present invention, the porous alumina granules and the carbon may be blended at any blending ratio satisfying their equivalence ratio or more, but in order to prevent aggregation of the granules and enhance their reactivity, the carbon is blended to the porous alumina granules at 1 to 3 times, preferably 1.2 to twice of the equivalence ratio in terms of carbon atom.

When a reducing gas is used as the reducing agent, a method for contacting a theoretical amount or more of gas with the porous alumina granules is typical in the reaction described below.

In the present invention, a reaction in the step of reduction-nitridation is preferably performed by firing the porous alumina granules while flowing nitrogen in the presence of a carbon and/or a reducing gas.

The firing is performed at 1400° C. or more and 1700° C. or less. That is, when the firing temperature is less than 1400° C., nitrogenation reaction fails to proceed sufficiently. When more than 1700° C., there is a risk that oxynitride (AlON) with low heat conductivity is formed. Further, when reductive nitrogenation is performed at an unduly high temperature, crystal growth of the resulting aluminum nitride proceeds easily, which makes it difficult to sufficiently increase density of the aluminum nitride in the following step of sintering.

In the step of reduction-nitridation of the present invention, the reaction time cannot be determined unconditionally as it is different according to conditions to be used, but the reaction time is generally 1 to 10 hours, preferably 3 to 8 hours.

The above reductive nitrogenation reaction can be performed with a known reactor. Specifically, the known reactor includes a stationary reactor, such as a muffle furnace, a fluid reactor, such as a fluidized bed, and a rotary reactor, such as a rotary kiln.

In the above-mentioned step of reduction-nitridation, using porous alumina granules makes it possible to obtain porous aluminum nitride granules whose inside is sufficiently nitrogenated in a porous condition. Here, a nitriding ratio showing a degree of the nitrogenation is favorably higher in view of heat conductivity, and a conversion into aluminum nitride defined in Examples is 50% or more, preferably 60% or more, and more preferably 80% or more. In the method of the present invention, the conversion may be 100% because of the above reason, and this is preferable. A specific surface area of the porous aluminum nitride granules varies slightly based on the firing conditions, but is generally 0.5 to 50 $m^2/g$, preferably 0.7 to 10 $m^2/g$, and more preferably 0.9 to 5 $m^2/g$.

[Step of Sintering]

In the present invention, the step of sintering is a step of obtaining sintered aluminum nitride granules. That is, the porous aluminum nitride granules obtained in the step of reduction-nitridation are fired under a reducing atmosphere or a neutral atmosphere, and aluminum nitride particles composing the porous aluminum nitride granules are sintered to be dense.

A firing temperature for the above sintering is 1580° C. or more and 1900° C. or less, preferably 1600° C. or more and 1800° C. or less. That is, when the firing temperature is less than 1580° C., the sintering proceeds insufficiently. When more than 1900° C., solid solution of carbon and aluminum nitride is formed and heat conductivity is decreased.

The firing may adopt a reducing or neutral atmosphere, but when the step of reduction-nitridation and the step of sintering are performed continuously as mentioned below, the atmosphere during the firing is preferably a reducing atmosphere that is the same as an atmosphere of the step of reduction-nitridation.

Thus, the reducing atmosphere can be formed by leaving the reducing agent used in the previous step of reduction-nitridation as it is, but a new one may be supplied. In particular, it is preferred to perform the firing in the presence of carbon powder used as the reducing agent because bonding of granules undesirably happened during the sintering can be prevented effectively.

In the step of sintering of the present invention, the firing time cannot be determined unconditionally as it is different according to conditions to be used, but the firing time is generally 1 to 24 hours, preferably 3 to 10 hours.

The step of sintering can be performed using a reactor that is the same as one used in the step of reduction-nitridation.

According to the step of sintering of the present invention, sintered aluminum nitride granules with a dense structure can be obtained. That is, sintered aluminum nitride granules obtained by the method of the present invention have an average particle size of 10 to 200 μm, a BET specific surface area of 0.05 $m^2/g$ to 0.5 $m^2/g$, and almost no pores. For example, in the sintered aluminum nitride granules of the present invention, a volume of pores having 2 μm or less of pore diameter is 0.2 $cm^3/g$ or less, preferably 0.1 $cm^3/g$ or less.

[Continuous Implementation of Step of Reduction-Nitridation and Step of Sintering]

In the present invention, the step of reduction-nitridation and the step of sintering can be performed separately, but both steps are preferably performed continuously without lowering the temperature to attain such effect that energy for reheating can be decreased.

Specifically, the firing in the step of sintering can be continuously performed in the same reactor without removing porous aluminum nitride granules from a reactor used in the step of reduction-nitridation. In this case, switching the steps can be made just by adjusting the firing temperature used in the step of reduction-nitridation to the firing temperature used in the step of sintering, and if necessary, controlling the supply amount of nitrogen gas. Thus, the switching is extremely easy for operation.

Note that, the firing temperature range of the step of reduction-nitridation and that of the step of sintering are overlapped, and thus both steps can be performed at the same temperature. In this case, these steps can be performed continuously just by controlling the flow of the nitrogen gas supplied as needed.

In the above continuous steps of the present invention, the firing time can be determined based on a total time of the firing time of each step and is generally 2 to 34 hours, preferably 6 to 18 hours.

[Oxidation Treatment]

In the present invention, when a carbon is used in the step of reduction-nitridation or so, the carbon remains in sintered aluminum nitride granules to be obtained, and thus the carbon is preferably finally removed by performing an oxidation treatment. Any gas capable of removing carbon, such as air and oxygen, may be used without limitation as an oxidizing gas for this oxidizing treatment, but air is favorable in view of economy and content of oxygen of aluminum nitride to be obtained. The treatment temperature is usually 500 to 900° C., preferably 600 to 750° C. by taking the decarbonization efficiency and excess of oxidation on the surface of aluminum nitride into consideration. The time of the oxidation treatment can be properly determined according to the remaining amount of carbon.

<Application>

The sintered aluminum nitride granules of the present invention can be widely used as a filler for heat-radiating materials to various applications utilizing the properties of the aluminum nitride, such as heat-radiating sheet, heat-radiating grease, heat-radiating adhesive, coating material, and heat-conducting resin.

As the resin or grease that serves as the matrix of the heat-radiating material, there can be exemplified thermosetting resins such as epoxy resin and phenol resin; thermoplastic resins such as polyethylene, polypropylene, polyamide, polycarbonate, polyimide and polyphenylene sulfide; rubbers such as silicone rubber, EPR and SBR; and silicone oil. The heat-radiating material is added desirably in an amount of 150 to 1000 parts by weight per 100 parts by weight of the resin or grease. As the heat-radiating material, there can be used one or several kinds of fillers such as alumina, boron nitride, zinc oxide, silicon carbide and graphite in addition to the sintered aluminum nitride granules of the present invention. These fillers may be those of which surfaces are treated, for example, with silane-coupling agent or so. The shape and particle size of the sintered aluminum nitride granules of the present invention and other fillers may be selected depending upon the properties and use of the heat-radiating material. Further, the ratio of mixing the aluminum nitride granules and other fillers in the heat-radiating material can be suitably adjusted in a range of 1:99 to 99:1. Further, additives such as plasticizer, vulcanizer, curing promoter, and parting agent may be added to the heat-radiating material.

The average particle size of the sintered aluminum nitride granules of the present invention may be within a range of 10 to 200 μm, but is preferably 15 to 150 μm, more preferably 20 to 100 μm as the filler. The sintered aluminum nitride granules whose average particle size is within these range are easily highly filled in matrix and easily used with other fillers.

The sphericalness of the sintered aluminum nitride granules of the present invention is preferably 0.80 or more, more preferably 0.85 or more, and still more preferably 0.90 or more. Here, the sphericalness is calculated from (short diameter of particle)/(long diameter of particle). The sintered aluminum nitride granules are brought close to true sphere as the sphericalness approaches 1, and then fluidity is improved. By further approaching true sphere, the sintered aluminum nitride granules are easily highly filled in resin or grease in accordance with close-packed structure model.

If attempting to obtain a granule body having the above-mentioned particle size favored in the present invention by the conventional method, the granule body is combined with other particles and deformed with increase in conversion into aluminum nitride, and the sphericalness tends to decrease. On the other hand, the sintered aluminum nitride granules obtained by the method of the present invention are characterized by that the sintered aluminum nitride granules to be obtained maintain a high sphericalness even if conversion into aluminum nitride is 100% by forming the shape of the starting material of the porous alumina granules into sphere.

EXAMPLES

Hereinafter, the present invention will be more specifically explained, but is no way limited to the following Examples. Properties of Examples and Comparative Examples were measured by the following methods.

(1) Specific Surface Area

Specific surface areas were measured by the BET single point method.

(2) Average Particle Size

Samples were dispersed in an aqueous solution containing 5% of sodium pyrophosphate by a homogenizer. Then, an average particle size ($D_{50}$) of the samples was measured by a laser diffraction particle size distribution measuring apparatus (MICROTRAC HRA manufactured by NIKKISO CO., LTD.).

(3) Conversion into Aluminum Nitride

Relying upon the X-ray diffraction (CuKα, 10 to 70°), a conversion into aluminum nitride was calculated (Formula (1)) by the calibration curve method according to the total ratio of peak intensities of major peaks of aluminum nitride (AlN) (peak stemming from the plane (100)) and major peaks of alumina components (α-alumina, θ-alumina, γ-alumina, δ-alumina etc.).

[Formula 1]

Formula 1

$$\text{Conversion into aluminum nitride (\%)} = \frac{\text{AlN peak intensity}}{\text{AlN peak intensity} + \text{Total of peak intensity of each alumina}} \times 100 \quad (1)$$

Examples of major peaks of the alumina components are as below.

α-alumina: peak stemming from the plane (113)
γ-alumina: peak stemming from the plane (400)
θ-alumina: peak stemming from the plane (403)
δ-alumina: peak stemming from the plane (046)

(4) Sphericalness

A hundred particles were arbitrarily selected from an image of an electron microphotograph, and long diameters (DL) and short diameters (DS) of each particle image were measured by using a scale. Then, an average value of the ratios (DS/DL) thereof was regarded to be the sphericalness.

(5) Pore Size Distribution

A pore size distribution of aluminum nitride powder was measured by using the mercury intrusion porosity method using a pore distribution measurement apparatus (Autopore IV9510 (commercial name) manufactured by Micromellitics Co.).

(6) Heat conductivity of the Silicone Rubber Sheet

A heat conducting silicone rubber composition was formed into a size of 10 cm×6 cm and 3 mm thick, and was cured by heating in an oven of the hot air circulation type maintained at 150° C. for an hour. Then, a heat conductivity was measured by using a heat conductivity measuring instrument (QTM-500 manufactured by Kyoto Electronics Manufacturing Co., Ltd.). Note that, in order to prevent the leakage of current through the portion being detected, the measurement was performed through a polyvinylidene chloride film having a thickness of 10 μm.

Example 1

As porous alumina granules, granular boehmite having an average particle size of 63 μm and a specific surface area of 164 m$^2$/g was subject to heat treatment at 1200° C. for 5 hours while flowing the air and converted into α-alumina. After mixing 280 g of the resulting spherical porous alumina granules and 140 g of carbon black, this mixture was filled in a carbon container and fired at a firing temperature of 1600° C. for 5 hours while flowing nitrogen in a resistance-heating atmosphere furnace apparatus (Step of Reduction-Nitridation).

Thereafter, the firing temperature was increased to 1750° C. and firing was performed for 5 hours in the same apparatus (Step of Sintering). Then, an oxidation treatment was performed at 680° C. for 8 hours while flowing the air to obtain sintered aluminum nitride granules.

The obtained sintered aluminum nitride granules were measured for average particle size, specific surface area, conversion into aluminum nitride, sphericalness, and pore size distribution according to the above-mentioned methods. The results are shown in Table 1.

Further, 450 parts by weight of the obtained sintered aluminum nitride granules, 100 parts by weight of millable silicone (TSE201 manufactured by Momentive Performance Materials Japan LLC), and 0.5 parts by weight of a parting agent were kneaded together in a pressurized kneader. Next, after this kneaded mixture was cooled and mixed with 0.5 parts by weight of a crosslinking agent by using a roll, this mixture was pressed at 180° C. for 15 minutes to obtain a sheet of 10 cm long, 6 cm wide and 3 mm thick. The obtained sheet was measured for its heat conductivity according to the above-mentioned method. The results are shown in Table 1.

To check the particle morphology of the porous aluminum nitride granules after the step of reduction-nitridation, under the same conditions as the above, the firing was stopped just after performing the step of reduction-nitridation, and the resulting porous aluminum nitride granules were measured for specific surface area and conversion into aluminum nitride. The results are shown in Table 1.

Note that, the above measurements were performed after the oxidation treatment for removing coexisting carbon powder.

Example 2

Sintered aluminum nitride granules were obtained in the same manner as in Example 1, except that the firing temperature in the step of reduction-nitridation was 1450° C. and that the firing temperature in the step of sintering was 1750° C. Table 1 shows the measurement results of average particle size, specific surface area, conversion into aluminum nitride, sphericalness, and pore size distribution of the obtained sintered aluminum nitride granules.

With regard to the obtained aluminum nitride powder, a sheet was prepared, and heat conductivity and hardness were measured in the same manner as in Example 1. The results are shown in Table 1.

Figure 2:
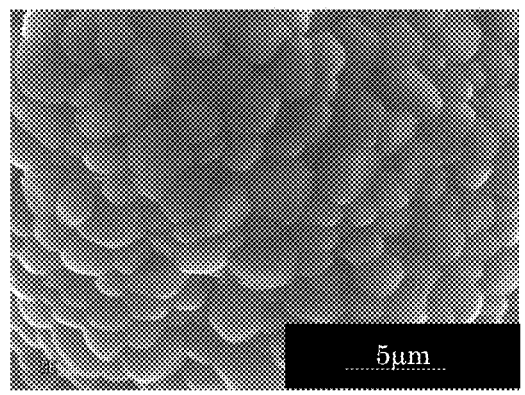
FIG. 2 is a scanning electron micrograph showing an enlarged particle structure of sintered aluminum nitride granules obtained in Example 2.

Scanning electron microscope images of the sintered aluminum nitride granules obtained under the conditions of Example 2 are shown in FIG. 1 and FIG. 2. FIG. 1 shows that the spherical sintered aluminum nitride granules were obtained. Also, FIG. 2 shows that densification of aluminum nitride crystal particles composing the granules proceeded, and dense aluminum nitride particles with no pores were obtained.

To check the particle morphology of the porous aluminum nitride granules after the step of reduction-nitridation, under the same conditions as the above, the firing was stopped just after performing the step of reduction-nitridation, and resulting porous aluminum nitride granules were measured for specific surface area and conversion into aluminum nitride. The results are shown in Table 1.

Note that, the above measurements were performed after the oxidation treatment for removing coexisted carbon powder.

Example 3

Granular boehmite having an average particle size of 40 µm and a specific surface area of 135 m²/g was used as porous alumina granules, and 280 g of the porous alumina granules and 140 g of carbon black were mixed. Next, this mixed powder was filled in a carbon container, and the step of reduction-nitridation was performed by firing at a firing temperature of 1450° C. for 5 hours while flowing nitrogen in a resistance-heating atmosphere furnace apparatus. Then, the step of sintering was performed by firing at an increased firing temperature of 1750° C. for 5 hours. After that, an oxidation treatment was performed at 680° C. for 8 hours while flowing the air to obtain sintered aluminum nitride granules. The obtained sintered aluminum nitride granules were measured for average particle size, specific surface area, conversion into aluminum nitride, sphericalness, and pore size distribution according to the above-mentioned methods. The results are shown in Table 1.

Further, with regard to the obtained aluminum nitride powder, a sheet was prepared, and heat conductivity was measured in the same manner as in Example 1. The results are shown in Table 1.

To check the particle morphology of the porous aluminum nitride granules after the step of reduction-nitridation, under the same conditions as the above, the firing was stopped just after performing the step of reduction-nitridation, and resulting porous aluminum nitride granules were measured for specific surface area and conversion into aluminum nitride. The results are shown in Table 1.

Note that, the above measurements were performed after the oxidation treatment for removing coexisted carbon powder.

TABLE 1

| | | Ex. 1 | Ex. 2 | Ex. 3 |
|---|---|---|---|---|
| AlN sintered granules | Average particle size [µm] | 62 | 66 | 40 |
| | Specific surface area [m²/g] | 0.18 | 0.14 | 0.17 |
| | Conversion into AlN [%] | 100 | 100 | 100 |
| | Sphericalness | 0.85 | 0.86 | 0.85 |
| | Total volume of pores of diameters of 2 µm or less [cm³/g] | <0.01 | <0.01 | <0.01 |
| Sheet | Heat conductivity [W/m · K] | 2.8 | 2.8 | 2.9 |
| Porous AlN granules | Specific surface area [m²/g] | 0.98 | 3.63 | 3.72 |
| | Conversion into AlN [%] | 100 | 100 | 100 |
| Remarks | (Starting materials) | Granular α-alumina | Granular α-alumina | Granular boehmite |

Comparative Example 1

Sintered aluminum nitride granules were obtained in the same manner as in Example 1, except that the firing was performed at a firing temperature of 1450° C. for 5 hours in the step of reduction-nitridation and the step of firing. Table 2 shows the measurement results of average particle size, specific surface area, conversion into aluminum nitride, sphericalness, and pore size distribution of the obtained sintered aluminum nitride granules.

With regard to the obtained sintered aluminum nitride granules, a sheet was prepared, and heat conductivity was measured in the same manner as in Example 1. The results are shown in Table 2.

Comparative Example 2

Sintered aluminum nitride granules were obtained in the same manner as in Example 1, except that the firing temperature in the step of reduction-nitridation was 1450° C. and that the sintering temperature was 1550° C. Table 2 shows the measurement results of average particle size, specific surface area, conversion into aluminum nitride, sphericalness, and pore size distribution of the obtained sintered aluminum nitride granules.

With regard to the obtained sintered aluminum nitride granules, a sheet was prepared, and heat conductivity was measured in the same manner as in Example 1. The results are shown in Table 2.

Comparative Example 3

Sintered aluminum nitride granules were obtained in the same manner as in Example 1, except that the firing was performed at a firing temperature of 1800° C. for 10 hours in the step of reduction-nitridation and the step of firing. Table 2 shows the measurement results of average particle size, specific surface area, conversion into aluminum nitride, sphericalness, and pore size distribution of the obtained sintered aluminum nitride granules.

With regard to the obtained sintered aluminum nitride granules, a sheet was prepared, and heat conductivity was measured in the same manner as in Example 1. The results are shown in Table 2.

TABLE 2

| | | Comp. Ex. 1 | Comp. Ex. 2 | Comp. Ex. 3 |
|---|---|---|---|---|
| AlN sintered granules | Average particle size [μm] | 65 | 65 | 67 |
| | Specific surface area [m²/g] | 3.51 | 1.02 | 0.63 |
| | Conversion into AlN [%] | 100 | 100 | 92 |
| | Sphericalness | 0.92 | 0.90 | 0.85 |
| | Total volume of pores of diameters of 2 μm or less [cm³/g] | 0.53 | 0.23 | <0.01 |
| Sheet | Heat conductivity [W/m·K] | 2.1 | 2.3 | 1.6 |
| Remarks | (Starting materials) | Granular α-alumina | Granular α-alumina | Granular α-alumina |

Example 4

5 parts by weight of yttrium oxide, 100 parts by weight of toluene solvent, 5 parts by weight of butyl methacrylate, and 2 parts by weight. of hexaglycerin monooleate were added to 100 parts by weight of boehmite powder, followed by mixing in a ball mill for 5 hours. Then, the obtained slurry was spray dried to obtain granules having an average particle size of 50 μm. The obtained granules were subject to heat treatment at 1200° C. for 5 hours while flowing the air and converted into α-alumina to obtain porous alumina granules.

After mixing 280 g of the obtained porous alumina granules and 140 g of carbon black, the firing was performed at a firing temperature of 1600° C. for 10 hours while flowing nitrogen in the step of reduction-nitridation and the step of firing. Then, an oxidation treatment was performed at 680° C. for 8 hours while flowing the air to obtain sintered aluminum nitride granules. The obtained sintered aluminum nitride granules were measured for average particle size, specific surface area, conversion into aluminum nitride, sphericalness, and pore size distribution according to the above-mentioned methods. The results are shown in Table 3.

Further, with regard to the obtained sintered aluminum nitride granules, a sheet was prepared, and heat conductivity was measured in the same manner as in Example 1. The results are shown in Table 3.

Example 5

Sintered aluminum nitride granules were obtained in the same manner as in Example 4, except that 5 parts by weight of calcium carbonate were added instead of yttrium oxide. Table 3 shows the measurement results of average particle size, specific surface area, conversion into aluminum nitride, sphericalness, and pore size distribution of the obtained sintered aluminum nitride granules. With regard to the obtained sintered aluminum nitride granules, a sheet was prepared, and heat conductivity was measured in the same manner as in Example 1. The results are shown in Table 3.

TABLE 3

| | | Ex. 4 | Ex. 5 |
|---|---|---|---|
| AlN sintered granules | Average particle size [μm] | 65 | 65 |
| | Specific surface area [m²/g] | 0.12 | 0.13 |
| | Conversion into AlN [%] | 100 | 100 |
| | Sphericalness | 0.87 | 0.86 |
| | Total volume of pores of diameters of 2 μm or less [cm³/g] | <0.01 | <0.01 |
| Sheet | Heat conductivity [W/m·K] | 2.9 | 2.7 |
| Remarks | (Starting materials) | Granular α-alumina (Addition of yttrium oxide) | Granular α-alumina (Addition of calcium carbonate) |

INDUSTRIAL APPLICABILITY

Spherical sintered aluminum nitride granules obtained in the present invention have shape and particle size that are suitable as fillers. Thus, they can be highly filled in resin or grease, which makes it possible to obtain heat-radiating sheets, heat-radiating grease, heat-radiating adhesives having high thermal conductivity, and the like.

The invention claimed is:

1. A method for producing sintered aluminum nitride granules comprising the steps of:
   reductively nitrogenating porous alumina granules having an average particle size of 10 to 200 μm and a BET specific surface area of 2 to 250 m²/g at a temperature of 1400° C. or more and 1700° C. or less so as to obtain porous aluminum nitride granules; and
   sintering the porous aluminum nitride granules obtained in the step of reduction-nitridation at a temperature of 1580° C. or more and 1900° C. or less so as to obtain sintered aluminum nitride granules having an average particle size of 10 to 200 μm and a BET specific surface area of 0.05 to 0.5 m²/g.

2. The method for producing sintered aluminum nitride granules according to claim 1, wherein the step of reduction-nitridation and the step of sintering are performed in a state where carbon powder is mixed with the porous alumina granules and the porous aluminum nitride granules.

3. The method for producing sintered aluminum nitride granules according to claim 1, wherein the step of reduction-nitridation and the step of sintering are performed continuously.

4. The method for producing sintered aluminum nitride granules according to claim 1, wherein the sintered aluminum nitride granules have a BET specific surface area of 0.05 or more to less than 0.5 m²/g.

5. The method for producing sintered aluminum nitride granules according to claim 1, wherein the sintered aluminum nitride granules have a volume of pores having 2 μm or less of pore diameter of 0.2 cm³/g or less.

6. The method for producing sintered aluminum nitride granules according to claim 5, wherein the sintered aluminum nitride granules have a volume of pores having 2 μm or less of pore diameter of 0.1 cm$^3$/g or less.

7. The method for producing sintered aluminum nitride granules according to claim 6, wherein the sintered aluminum nitride granules have a volume of pores having 2 μm or less of pore diameter of less than 0.01 cm$^3$/g.

* * * * *